Feb. 4, 1969  R. L. STONE  3,425,769
ORALLY OPERATED BINOCULAR CONTROL MEANS
Filed June 9, 1966

INVENTOR
R. L. STONE
BY Harry M. Saragovitz
Edward J. Kelly
Herbert Berl
John W. Poteet, Jr.
ATTORNEYS United States Patent Office 3,425,769
Patented Feb. 4, 1969

3,425,769
ORALLY OPERATED BINOCULAR
CONTROL MEANS
Robert L. Stone, Washington, D.C., assignor to the United
States of America as represented by the Secretary of
the Army
Filed June 9, 1966, Ser. No. 556,844
U.S. Cl. 350—72                                2 Claims
Int. Cl. G02b 7/02

ABSTRACT OF THE DISCLOSURE

This invention is a head gear binocular means especially useful in conjunction with vehicle operation and in conjunction with other applications which require full time utilization of both hands and feet of the operator. The binocular means embodies an adjustment means and a control means therefor which is disposed within the mouth of the operator and is responsive to bite action.

---

Head gear supported binocular devices have been devised primarily as an aid to military vehicle operators who are required to keep both hands on the steering wheel and both feet on the foot pedals at all times. In practice it has been found that it is frequently necessary, during infrared illuminated night driving especially, to make adjustments to accommodate for differing driving conditions. While various devices have bene employed in the past to adjust focus as required, it has been found desirable not only that the adjustment be automatic but that the viewer be in full control; that is, able to override the automatic adjustment means at all times. It will be appreciated that in some instances, the magnitude of the focus deviation does not justify complex control means, but that some adjustment may be required occasionally. Thus the need has developed for an adjustment means which does not necessitate the use of the operator's hands or feet.

Accordingly,

It is an object of this invention to provide a binocular control means which is operated other than by hand or foot.

It is another object of this invention to provide an orally operated override control means for headgear supported binoculars.

It is a further object of this invention to provide a relatively fast response control means for focusing headgear supported binoculars.

Figure 1:
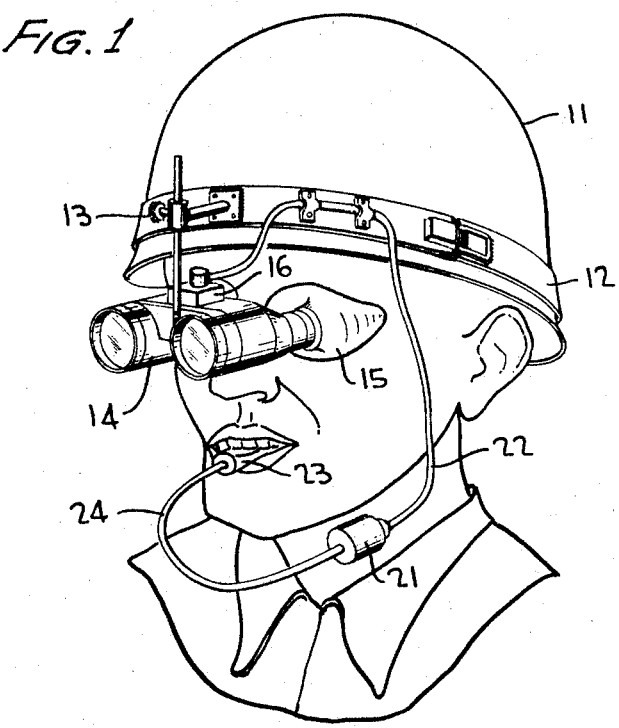
Figure 1:
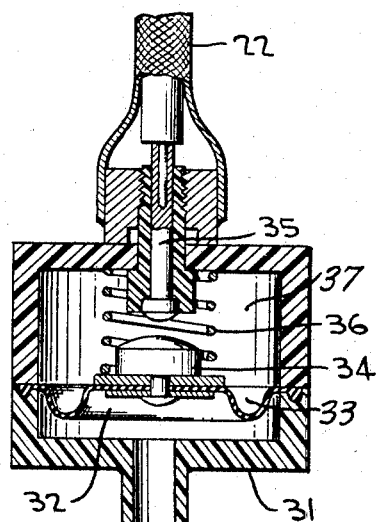
Figure 2:
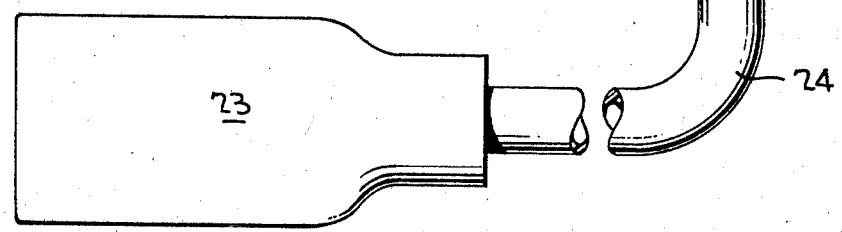

Other objects of this invention will become apparent upon a more comprehensive understanding of the invention for which reference is had to the following specification and drawings wherein FIGURE 1 is a pictorial view of a vehicle operator wearing headgear supported binoculars adapted in accordance with this invention, and FIGURE 2 is a more detailed showing of the pneumatic assembly shown in the embodiment of FIGURE 1.

Referring now to the drawings in more detail.

FIGURE 1 depicts a typical head gear supported binocular means in accordance with the present invention as might be worn by a military vehicle operator. In FIGURE 1 the helmet 11 has a conventional harness 12 strapped thereto with a support bracket 13 adapted to hold binocular means 14 in appropriate position for viewing therethrough. In accordance with standard practice, the binocular means 14 include eyeshield means 15 to restrict extraneous lighting which might interfere with the viewing operation. Electrical motor drive means 16 are disposed on top of the binocular means 14 to drive the focusing mechanism thereof when energized by a voltage source, not shown, which may be carried on the person in conventional fashion, for example, within the helmet.

In accordance with the invention, a pneumatic pressure actuated electrical switching means 21 is connected via electrical cable means 22 to the electrical drive means 16 and a pressure sack 23, which may be made of rubber, together with pressure tubing 24 are connected to said electrical switching means 21 to actuate same. As shown in the drawing, the pressure sack 23 is adapted to be disposed within the oval cavity of the operator such that the electrical switching means 21 may be actuated by bite action of the operator. It is understood, of course, that it is within the purview of this disclosure to adapt the pressure sack 23 such that the tongue of the operator may be utilized to actuate the switching means 21 either as a substitute for bite action or in supplementation thereof. Likewise, it will be appreciated that the electrical switching means 21 may incorporate more than one control circuit adapted to reverse direction of the motor means for example. In such instance, reversal of direction may be accomplished by selected bite or tongue action for example; two bites in quick succession, simultaneous tongue and jaw action, etc. It is within the purview of this disclosure, of course, to employ more than one pressure system to control the switching means 21 either by the incorporation of additional oral cavity pressure sacks in like manner or by compartmenting the single pressure sack illustrated.

FIGURE 2 is a more detailed showing of one embodiment of the electrical switching means 21 shown in the assembly of FIGURE 1. In accordance with the invention, the switching means is enclosed in a rigid housing, indicated at 31, which may be made of metal as shown, or other appropriate material, such as plastic. Disposed within the housing 31 is a resilient diaphragm member 33 which divides two chambers, indicated at 32 and 37, within the housing. A pneumatic tubing 24 interconnects the pressure sack 23 and the chamber 32 within the housing 31.

As shown in the drawing, the diaphragm member 33 may have an electrical contact 34 affixed thereto adapted to mate with stationary contact 35 when the diaphragm member 33 is moved in response to an increase in pressure within the chamber 32. In this embodiment a metallic coil spring member, indicated at 36, is provided to restrict the movement of the moveable electrical contact 34 and to provide an electrical connection between the contact 34 and the housing 31. It will be appreciated that it is not critical to this invention that such a spring member be provided. Moreover, the spring member 36 may be other than metallic, if desired, provided, of course, binding strap means, not shown, are incorporated to make the electrical connection to the contact 34.

In this embodiment, the electrical cable 22 is of the coaxial variety and the stationary contact is effectively an extension of the center conductor thereof. While this concentric arrangement of the contacts 34, 35, spring 36 and the outer conductor of cable 24 affords many advantages, it will be appreciated that this invention is not restricted to a specific form of electrical cable connection or pneumatic switch housing configuration.

Finally it is understood that this invention is to be limited only by the scope of the claims appended hereto.

What is claimed is:

1. A headgear-binocular assembly wherein the binocular unit is supported by the headgear and the improvement comprises electro-mechanical means attached to said binocular unit for focal adjusting, thereof, a means first pressure responsive pneumatic means connected to said electro-mechanical for control of said electro-mechanical means by disposition within the oral cavity between cooperating jaw sections of personnel utilizing said assembly and responsive at least in part to bite action by said personnel, and second pressure responsive means connecting said first pressure responsive means to said electro-mechanical means such that selected bite action by said personnel on said first pressure responsive means controls a change in adjustment of said binocular unit through said electro-mechanical means by electrically energizing said electro-mechanical means in response to said bite action on said first pressure responsive means.

2. A headgear-binocular assembly as defined in claim 1 wherein said pressure sensitive means are interconnected by at least one hollow tubing.

References Cited

UNITED STATES PATENTS

| 799,444 | 9/1905 | Brown. | |
|---|---|---|---|
| 1,795,425 | 3/1931 | Cover | 350—72 |
| 1,811,614 | 6/1931 | Cover | 350—72 |
| 2,848,924 | 8/1958 | Potez | 350—72 |
| 3,350,977 | 11/1967 | Gans et al. | 350—84 |

FOREIGN PATENTS 1,316,033  12/1962  France.

DAVID SCHONBERG, *Primary Examiner.*

P. R. GILLIAM, *Assistant Examiner.*

U.S. Cl. X.R.

350—74, 248